US012764673B2

(12) United States Patent
Kim et al.

(10) Patent No.: US 12,764,673 B2
(45) Date of Patent: Oct. 13, 2026

(54) METHOD AND APPARATUS FOR CONTROLLING POWER OF BASE STATION IN SPECTRUM SHARING ENVIRONMENT

(71) Applicant: UIF (University Industry Foundation), Yonsei University, Seoul (KR)

(72) Inventors: Seong Lyun Kim, Seoul (KR); Kyu Won Han, Seoul (KR); Won Hyung Jung, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 278 days.

(21) Appl. No.: 18/244,529

(22) Filed: Sep. 11, 2023

(65) Prior Publication Data

US 2024/0381268 A1 Nov. 14, 2024

(30) Foreign Application Priority Data

May 9, 2023 (KR) ........................ 10-2023-0059870

(51) Int. Cl.
*H04W 52/24* (2009.01)
*H04W 16/14* (2009.01)

(52) U.S. Cl.
CPC ......... *H04W 52/243* (2013.01); *H04W 16/14* (2013.01)

(58) Field of Classification Search
CPC ............................ H04W 52/243; H04W 16/14
See application file for complete search history.

(56) References Cited

U.S. PATENT DOCUMENTS 10,412,592 B2 * 9/2019 Mueck .................. H04W 24/08
2008/0171565 A1 * 7/2008 Shan ..................... H04W 16/14 455/501
(Continued)

FOREIGN PATENT DOCUMENTS

EP 2227050 A2 * 9/2010 ............ H04W 24/02
JP 7031827 B2 3/2022
(Continued)

OTHER PUBLICATIONS

Walid A. Hassan et al., "Spectrum-Sharing Method for Co-Existence Between 5G OFDM-Based System and Fixed Service" IEEE Access (vol. 7, 2019).
(Continued)

*Primary Examiner* — Sujoy K Kundu
(74) *Attorney, Agent, or Firm* — Millen, White, Zelano & Branigan P.C.; William F. Nixon

(57) ABSTRACT

Disclosed herein is a method of controlling power of a base station in a spectrum sharing environment, which includes setting, by a control device, predetermined initial power information for a plurality of base stations located in a service area in a time slot t; calculating, by the control device, a coverage radius for each of the base stations on the basis of the initial power information; calculating, by the control device, gradients of a coverage area and an interference area for each of the base stations on the basis of the coverage radius for each of the base stations; and updating, by the control device, power information for each of the base stations in a time slot t+1 on the basis of the gradients of each of the base stations.

8 Claims, 5 Drawing Sheets

200

(56) References Cited

U.S. PATENT DOCUMENTS

| | | | | |
|---|---|---|---|---|
| 2013/0163565 | A1* | 6/2013 | Lee | H04W 64/003 370/332 |
| 2013/0217429 | A1* | 8/2013 | Kimura | H04W 52/244 455/509 |
| 2015/0146638 | A1* | 5/2015 | Ohwatari | H04W 16/08 370/329 |
| 2018/0110016 | A1* | 4/2018 | Li | H04B 1/00 |
| 2018/0220379 | A1 | 8/2018 | Zhang et al. | |
| 2018/0249380 | A1 | 8/2018 | Zhang et al. | |
| 2022/0286863 | A1* | 9/2022 | Sarkar | H04W 24/02 |
| 2022/0394491 | A1* | 12/2022 | Khawer | H04W 12/06 |
| 2022/0400487 | A1* | 12/2022 | Sevindik | H04W 72/0453 |

FOREIGN PATENT DOCUMENTS

| | | | |
|---|---|---|---|
| KR | 20160075663 | A | 6/2016 |
| KR | 101865227 | B1 | 6/2018 |
| KR | 1020230026084 | A | 2/2023 |

OTHER PUBLICATIONS

Korean Office Action dated Oct. 22, 2024, issued in corresponding application KR 10-2023-0059870 (pp. 1-5).

* cited by examiner

100

METHOD AND APPARATUS FOR CONTROLLING POWER OF BASE STATION IN SPECTRUM SHARING ENVIRONMENT

CROSS-REFERENCE TO RELATED APPLICATION

This application claims the benefit under 35 U.S.C. § 119(a) of Korean Patent Application No. 10-2023-0059870, filed on May 9, 2023, in the Korean Intellectual Property Office, the entire disclosure of which is incorporated herein by reference for all purposes.

BACKGROUND

1. Field

The following description relates to a power control technique in a spectrum sharing system using a regional cooperative scheme.

2. Discussion of Related Art

As mobile communication systems move from 5G to 6G, a data processing amount required by users is increasing. For example, deep learning applications, extended reality (XR), and the like require high communication speed and capacity. Various communication techniques are being studied for high communication speed and capacity.

In spectrum sharing, a number of entities divide and use the same frequency band. Korean e-Um 5G commercialized in December 2021 uses a common frequency band of 4.7 GHz. e-Um 5G corresponds to a 5G network which provides customized services for users in specific areas by reflecting ultra-high speed and ultra-low latency characteristics. e-Um 5G should coordinate interference in a mutually agreed manner using a regional cooperative scheme.

Citizens broadband radio service (CBRS) in the United States uses a scheme in which an incumbent user (top-tier user) uses a frequency band and other entities do not use the corresponding frequency band. This scheme is excellent for protecting the incumbent user, but is not efficient in terms of frequency sharing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description is directed to providing a power control technique for maximizing communication efficiency while minimizing an interference area in a regional frequency cooperative system.

In one general aspect, there is provided a method of controlling the power of a base station in a spectrum sharing environment, which includes setting, by a control device, predetermined initial power information for a plurality of base stations located in a service area in a time slot t; calculating, by the control device, a coverage radius for each of the base stations on the basis of the initial power information; calculating, by the control device, gradients of a coverage area and an interference area for each of the base stations on the basis of the coverage radius for each of the base stations; and updating, by the control device, power information for each of the base stations in a time slot t+1 on the basis of the gradients of each of the base stations.

In another aspect, there is provided an apparatus for controlling power of a base station in a spectrum sharing environment, which includes a control device configured to transmit predetermined initial power information for a plurality of base stations located in a service area in a time slot t, and a calculator configured to calculate gradients of a coverage area and an interference area for each of the base stations on the basis of a coverage radius, which is calculated on the basis of the initial power information, for each of the base stations and update power information for each of the base stations in a time slot t+1 on the basis of the gradients of each of the base stations.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The technology described below, is a power control method in a spectrum sharing system using a regional cooperative scheme such as e-Um 5G. That is, the technology described below is for maximizing communication efficiency by minimizing interference in a spectrum sharing system. For convenience of description, e-Um 5G will be mainly described below.

Figure 1:
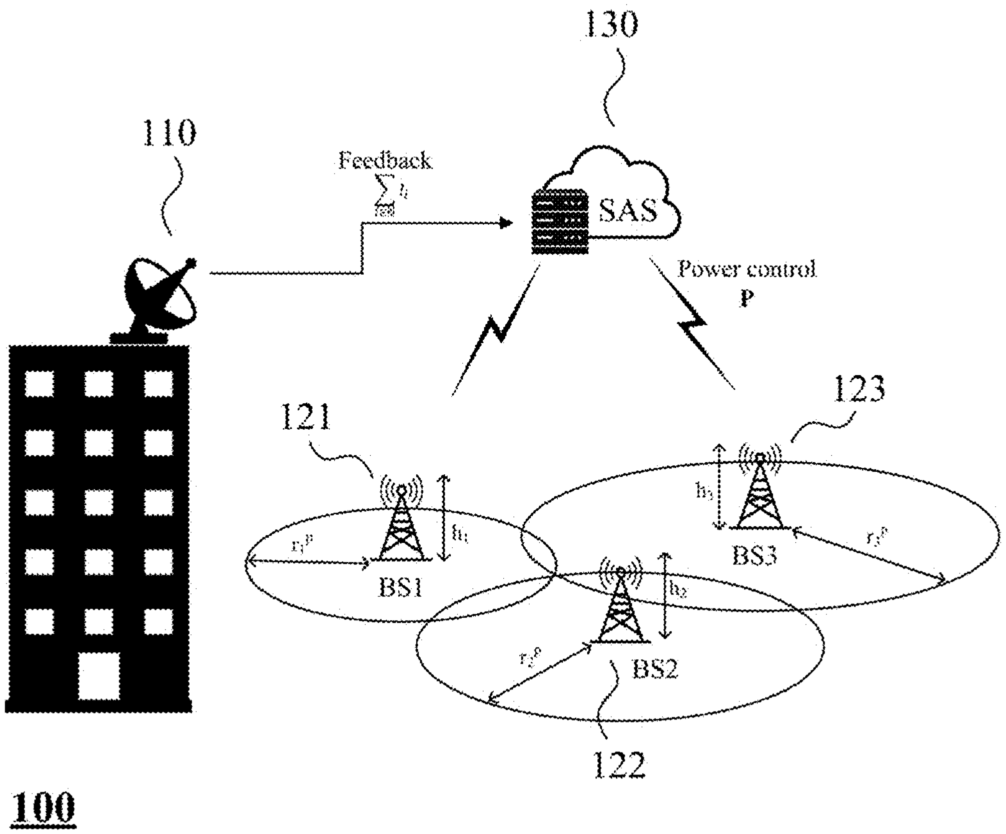
FIG. 1 is a diagram illustrating an example of a spectrum sharing system.

FIG. 1 shows an example of a spectrum sharing system 100. FIG. 1 shows an example of a spectrum sharing system for a certain service area.

A terminal 110 is an incumbent user in a spectrum sharing environment. Hereinafter, a user is an object that receives a communication service using frequency resources shared in e-Um 5G. An incumbent user (top-tier user) is a user with the highest priority for using the corresponding frequency resources. In FIG. 1, the terminal 110 is shown only in the form of a signal receiver. The terminal 110 may be any one among various devices including a communication module with an antenna. For example, the terminal 110 may be implemented in various forms such as smart devices, vehicles, robots, and setup boxes.

FIG. 1 shows three base stations BS. The base stations are each positioned at a predetermined altitude and position. The base station has a predetermined height and coverage radius. A first base station 121 (BS1) has a height $h_1$ and a coverage radius $r_1$, a second base station 122 (BS2) has a height $h_2$ and a coverage radius $r_2$, and a third base station 123 (BS3) has a height $h_3$ and a coverage radius $r_3$.

In the spectrum sharing system 100, a control device 130 controls the power of each base station. The control device 130 may be a device such as a spectrum access system (SAS).

The control device 130 may perform control to prevent the coverage areas of the base stations from overlapping. The control device 130 controls the power of the base station on the basis of the feedback transmitted from the terminal 110 that does know the position thereof. Here, the feedback represents the degree of interference. The control device 130 may control the power of the base station to allow the degree of interference to be maintained at a threshold or less.

The control device 130 dynamically and individually controls the power of the base station according to interference feedback of the terminal 110 in an environment in which the incumbent terminal 110 and the base stations 121, 122, and 123 coexist.

The inventors propose a mathematical approximation model for calculating a coverage area and an interference area between the base stations. A spectrum sharing scenario assumes a situation in which one incumbent user and N base stations are present. N={1, . . . , N} base stations are deployed at arbitrary altitudes and positions.

The control device controls the power of each base station. After the power control, the incumbent user transmits an interference sum of reference signals received power (RSRP) to the control device as feedback.

The goal of the control device is to maximize a coverage area $A_C$ while minimizing an interference area $A_I$ between base stations in a state in which the interference sum transmitted from the incumbent user is maintained at a target threshold $I_{max}$ or less. The object function of the control device may be defined as in the following Equation 1.

$$\begin{aligned} &\underset{P}{\text{maximize}}\ A_C(P) - \mu A_I(P) \\ &\text{subject to} \sum_{i \in \mathbb{N}} I_i \le I_{max}, \\ &P_{min} \le P_{i \in \mathbb{N}} \le P_{max}, \\ &\mu > 0, \end{aligned} \quad \text{[Equation 1]}$$

P denotes a vector indicating the power of the base station and has the form of P={P1, . . . , PN} for N base stations. μ is a parameter defining the sensitivity to an interference effect in the interference area. $I_i$ is the degree of interference (the sum of signal strengths) received by the incumbent user (terminal). It is assumed that the incumbent user does not identify which base station each received signal is from.

Generally, a signal at a distance d from a base station n has received power $p_{rx}(d)$ as in the following Equation 2.

$$P_{rx}(d) = 10\log_{10}|P_n - 10\gamma \cdot \log_{10}\frac{d}{d_0} + C + G \text{ [dBm]} \quad \text{[Equation 2]}$$

In Equation 2, $d_0$ denotes a reference distance, γ denotes a pass loss exponent, C denotes a path loss constant according to a channel characteristic, and G denotes an antenna gain.

A coverage radius $r_n$ is defined as a maximum distance with received power exceeding a threshold $P_{th}$. $r_n$ may be expressed as in the following Equation 3.

$$r_n = \max_d (P_{rx}(d) > P_{th}) \quad \text{[Equation 3]}$$

Considering a height $h_n$ of the base station with respect to $r_n$, a coverage radius $r_n^{(p)}$ projected on the ground may be defined as in the following Equation 4. FIG. 1 shows the coverage radius $r_n^{(p)}$ projected on the ground for a base station with a predetermined height.

$$r_n^{(p)} = \sqrt{r_n^2 - h_n^2} \quad \text{[Equation 4]}$$

Hereinafter, the coverage area and the interference area will be defined and described using a mathematical model.

Figure 2:
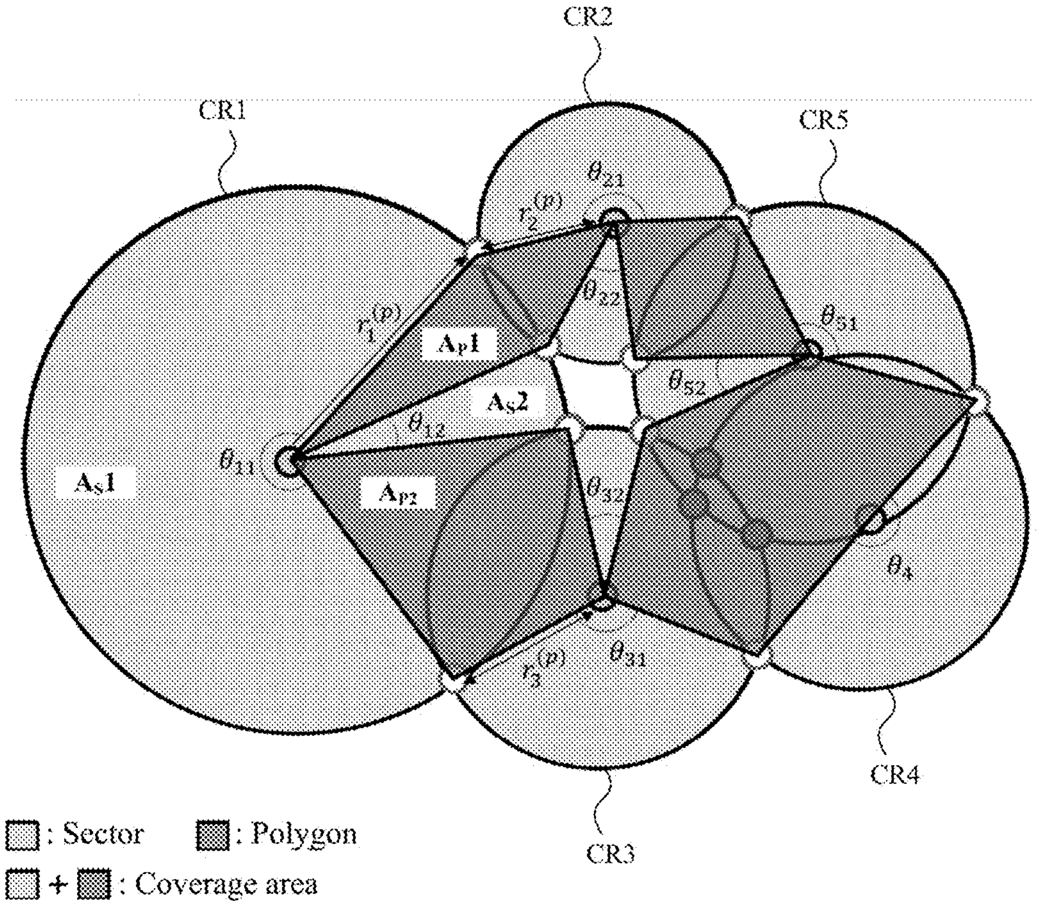
FIG. 2 is a diagram illustrating an example of coverage of base stations in the spectrum sharing environment.

First, the coverage area will be defined. FIG. 2 is a diagram illustrating an example of coverage of base stations in the spectrum sharing environment. A coverage circle is defined as the coverage radius expressed by Equations 3 and 4. FIG. 2 shows coverage circles CR1 to CR5 for five base stations.

As shown in FIG. 2, when the coverage circles intersect, a coverage area may be divided into a sector area $A_S$ and a polygon area $A_P$. Therefore, a coverage area $A_C$ of the base station is the sum of the sector area(s) and the polygon area(s) as in the following Equation 5. FIG. 2 shows the entire coverage area formed by the five base stations.

$$A_C(P) \approx A_S(\theta|P) + A_P(\phi|P) \quad \text{[Equation 5]}$$

θ and ϕ are parametric matrices.

θ denotes a parameter matrix for the sector area. θ is defined as [θ1, . . . , $\theta_N$]. N denotes the number of sector areas divided into polygons. $\theta_n \in$ N denotes an external angle with respect to a polygon area at the center of an $n^{th}$ coverage circle. In FIG. 2, CR1 includes Asl having $\theta_{11}$ and $A_S$2 having $\theta_{12}$.

ϕ denotes a parameter matrix for the polygon area. ϕ is defined as [$X_1$, . . . , $X_M$]. M denotes the number of polygon areas. $X_m$ denotes a set of two-dimensional coordinates constituting an $m^{th}$ polygon area, $X_m$=[x1, x2, . . . ; y1, y2, . . . ], and m∈M={1, . . . , M}. That is, $X_m$ is a set of coordinates capable of defining an area of a polygon in a two-dimensional coordinate system.

The polygon area may be defined by straight lines connecting a center point of the circle and points where the circles overlap. For example, in FIG. 2, CR1 and CR2 constitute a quadrangular region, CR1 and CR3 constitute a quadrangular region, and CR3, CR4, and CR5 constitute a pentagonal region.

The following Equation 6 is an equation defining the area of the sector area, and the following Equation 7 is an equation defining the area of the polygon area.

$$A_S(\theta|P) = \sum_{i \in \mathbb{N}} \frac{1}{2}\left(r_i^{(p)}\right)^2 \theta_i \qquad \text{[Equation 6]}$$

$$A_P(\phi|P) = \sum_{i \in \mathbb{M}} A_P(X_i|P) \qquad \text{[Equation 7]}$$

Assuming that the $m^{th}$ polygon region has k vertices, the area of the $m^{th}$ polygon region is expressed as in the following Equation 8.

$$A_P(X_m|P) = \frac{1}{2}\begin{vmatrix} x_1, & x_2, & \cdots & x_k, & x_1 \\ y_1, & y_2, & \cdots & y_k, & y_1 \end{vmatrix} \qquad \text{[Equation 8]}$$

Figure 3:
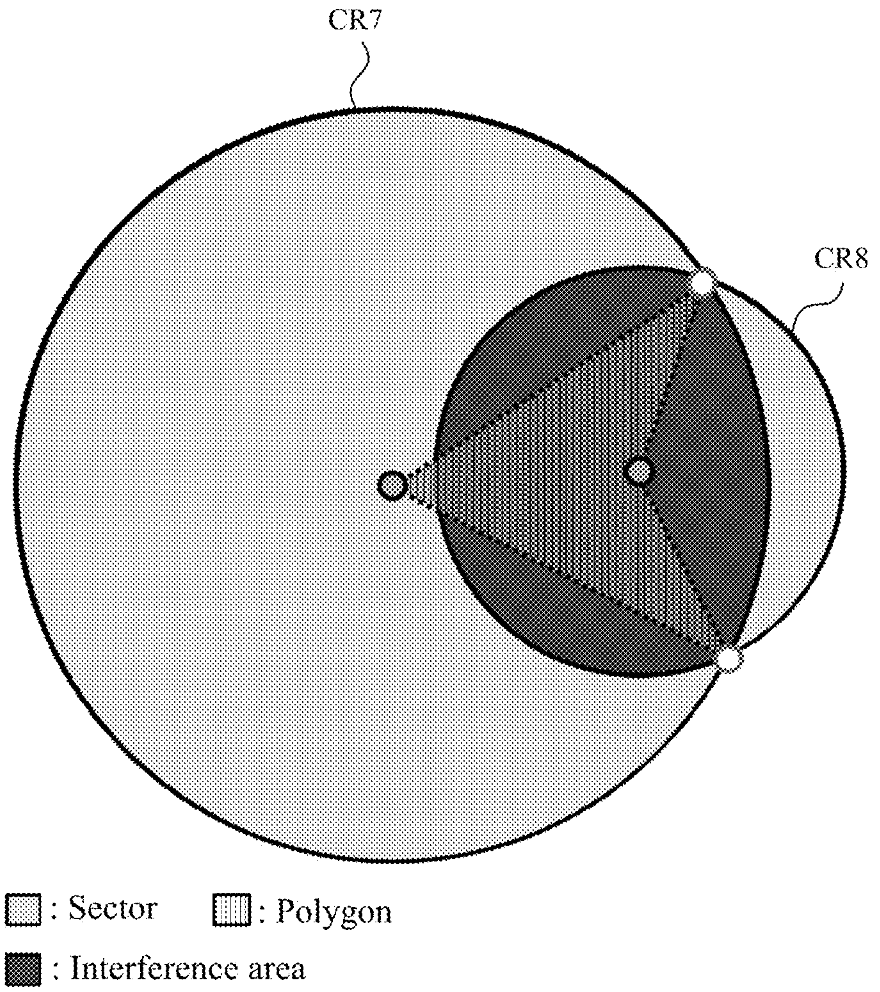
FIG. 3 is a diagram illustrating an example of interference areas between the base stations in the spectrum sharing environment.

Now, the interference area will be described. FIG. 3 is a diagram illustrating an example of the interference areas between base stations in a spectrum sharing environment. The interference area is defined as an area where the polygon areas and the coverage circles intersect. FIG. 3 shows an example of a situation in which coverage circles CR7 and CR8 overlap. In FIG. 3, an interference area is an area excluding the polygon area from the area where CR7 and CR8 overlap.

Assuming that an area where three or more circles overlap is rare, an interference area $A_I$(P) of a base station P may be approximately defined as in the following Equation 9 (see F. Librino et al., "An algorithmic solution for computing circle intersection areas and its applications to wireless communications," Wireless Commun. Mobile Comput., vol. 14, no. 18, pp. 1672-1690, 2014).

$$A_I(P) \approx A_S(2\pi \cdot J_{N\times1} - \theta \mid P) - A_P(\phi \mid P) \qquad \text{[Equation 9]}$$

$J_{N\times1}$ denotes a vector in which all elements are one for N components.

A scenario in which the control device controls power will be described. The control device controls the power of base stations based on one feedback cycle. The one feedback cycle may be referred to as one time slot.

The control device transmits power control information to each base station in a first time slot. Each base station transmits a radio signal with power according to the received power control information. An incumbent user sums interference values (based on radio signal strength) in a situation in which the base stations transmit radio signals and transmits the summed interference values to the control device.

Thereafter, the control device transmits power control information of the base station for a second time slot (next time slot) on the basis of feedback of the incumbent user in the first time slot.

In this case, the control device updates the power control information using a gradient descent algorithm as in the following Equation.

$$P[t+1] = P[t] + \alpha \cdot \nabla f[t] \qquad \text{[Equation 10]}$$

f denotes the object function defined in Equation 1. α denotes a learning rate.

Excluding a time index t, using Equation 5 for the coverage area and Equation 9 for the interference area, Equation 1 is rewritten as the following Equation 11.

$$\begin{aligned} f &\equiv A_C(P) - \mu \cdot A_I(P) \\ &= (A_S(\theta \mid P) - \mu \cdot A_S(2\pi \cdot J_{N\times1} - \theta \mid P) + (1+\mu)A_P(\phi \mid P). \end{aligned} \qquad \text{[Equation 11]}$$

In order to calculate ∇f, ∇($A_S$(θ|P) and ∇($A_P$(θ|P) need to be calculated. First, an adjacency indicator $H_{ij}$ is defined as in the following Equation 12.

$$H_{ij} = \begin{cases} 1, & \text{if } |r_i - r_j| < d_{ij} < r_i + r_j, \\ 0, & \text{if } i = j \text{ and otherwise,} \end{cases} \qquad \text{[Equation 12]}$$

{i,j}∈N, and $d_{ji}$ denotes a projection distance between an $i^{th}$ base station (center) and a $j^{th}$ base station (center) on the ground. Assuming that the power of an $n^{th}$ base station is changed to $\Delta P_n$ and $\Delta\theta_n$ is close to zero, a sector area is changed as in the following Equation 13.

$$A_S(\theta \mid P + \Delta P_n) \cong \frac{1}{2}\left(r_n^{(p)} + \Delta r_n^{(p)}\right)^2 \theta_n + \sum_{\substack{i \in \mathbb{N}, \\ H_{ni}=1}} \frac{1}{2}\left(r_i^{(p)}\right)^2 (\theta_i + \Delta\theta_i) + \sum_{\substack{i \in \mathbb{N}, \\ H_{ni}=0}} \frac{1}{2}\left(r_i^{(p)}\right)^2 + \theta_i \qquad \text{[Equation 13]}$$

The following Equation 14 is obtained by subtracting Equation 6 from Equation 13.

$$A_S(\theta \mid P + \Delta P_n) - A_S(\theta \mid P) \approx r_n^{(p)}\theta_n \Delta r_n^{(p)} + \frac{1}{2}\sum_{\substack{i \in \mathbb{N}, \\ H_{ni}=1}} \left(r_i^{(p)}\right)^2 \Delta\theta_i \qquad \text{[Equation 14]}$$

Equation 14 may be expressed as the following Equation 15.

$$A_S(2\pi \cdot J_{N\times1} - \theta \mid P + \Delta P_n) - A_S(2\pi \cdot J_{N\times1} - \theta \mid P) \approx \qquad \text{[Equation 15]}$$

-continued $$r_n^{(p)}(2\pi - \theta_n)\Delta r_n^{(p)} - \frac{1}{2}\sum_{\substack{i\in\mathbb{N},\\ H_{ni}=1}} \left(r_i^{(p)}\right)^2 \Delta\theta_i.$$

Similar to the sector area, a gradient of a polygon area may be expressed as the following Equation 16.

$$A_P(\phi \mid P + \Delta P_n) - A_P(\phi \mid P) \approx \sum_{\substack{i\in\mathbb{N},\\ H_{ni}=1}} \left(r_i^{(p)}\right)^2 \Delta\phi_i \quad \text{[Equation 16]}$$

$\varphi_i$ denotes an intermediate term.

$$\varphi_i = \frac{1}{2}(2\pi - \theta_i) \text{ and } \Delta\varphi_i = -\frac{1}{2}\Delta\theta_i$$

are defined.

When $\Delta P_n$ converges to zero, $$\frac{\Delta r_n^{(p)}}{\Delta P_n} \to \frac{dr_n^{(p)}}{dP_n} \text{ and } \frac{\Delta r_n^{(p)}}{\Delta P_n} \to \frac{d\theta_i}{dP_n}.$$

When Equation 11 is differentiated and then rewritten using Equations 16 and 15, the following Equation 17 is obtained. When a chain rule is applied to Equation 17, Equation 18 is obtained.

$$\frac{\partial f}{\partial P_n} = r_n^{(p)}((1+\mu)\theta_n - 2\pi\mu)\frac{dr_n^{(p)}}{dP_n} \quad \text{[Equation 17]}$$

$$\frac{dr_n^{(p)}}{dP_n} = \frac{\partial r_n^{(p)}}{\partial r_n}\frac{\partial r_n}{\partial P_n} \quad \text{[Equation 18]}$$

The right term of Equation 18 is expressed as the following Equations 19 and 20.

$$\frac{\partial r_n^{(p)}}{\partial r_n} = r_n\left(r_n^2 - h_n^2\right)^{-\frac{1}{2}} \quad \text{[Equation 19]}$$

$$\frac{\partial r_n}{\partial P_n} = \frac{1}{\gamma}P_n^{\left(\frac{1}{\gamma}-1\right)} \cdot 10^{-\frac{1}{10-\gamma}(P_{th}-C-G)} \quad \text{[Equation 20]}$$

Finally, $\nabla f$ is as in the following Equation 21.

$$\nabla f = \begin{bmatrix} \frac{\partial f}{\partial P_1} \\ \vdots \\ \frac{\partial j}{\partial P_N} \end{bmatrix} \quad \text{[Equation 21]}$$

When an interference power transmitted by the incumbent user exceeds a threshold $I_{max}$ in a time slot t, the control device may determine power in a time slot t+1 using $\beta$ as in the following Equation 22.

$$P[t+1] = \beta \cdot P[t],\ 0 < \beta < 1. \quad \text{[Equation 22]}$$

The power control algorithm ends when an object function f[t*] has the largest value in the next Q cycle as in the following Equation 23. When the following object function is not satisfied, the Q cycle denotes the number of repetitions of power control for a corresponding time slot (NO in 260).

$$f[t^*] \geq f[t] \text{ for } t \in [t^*, t^* + Q] \quad \text{[Equation 23]}$$

Figure 4:
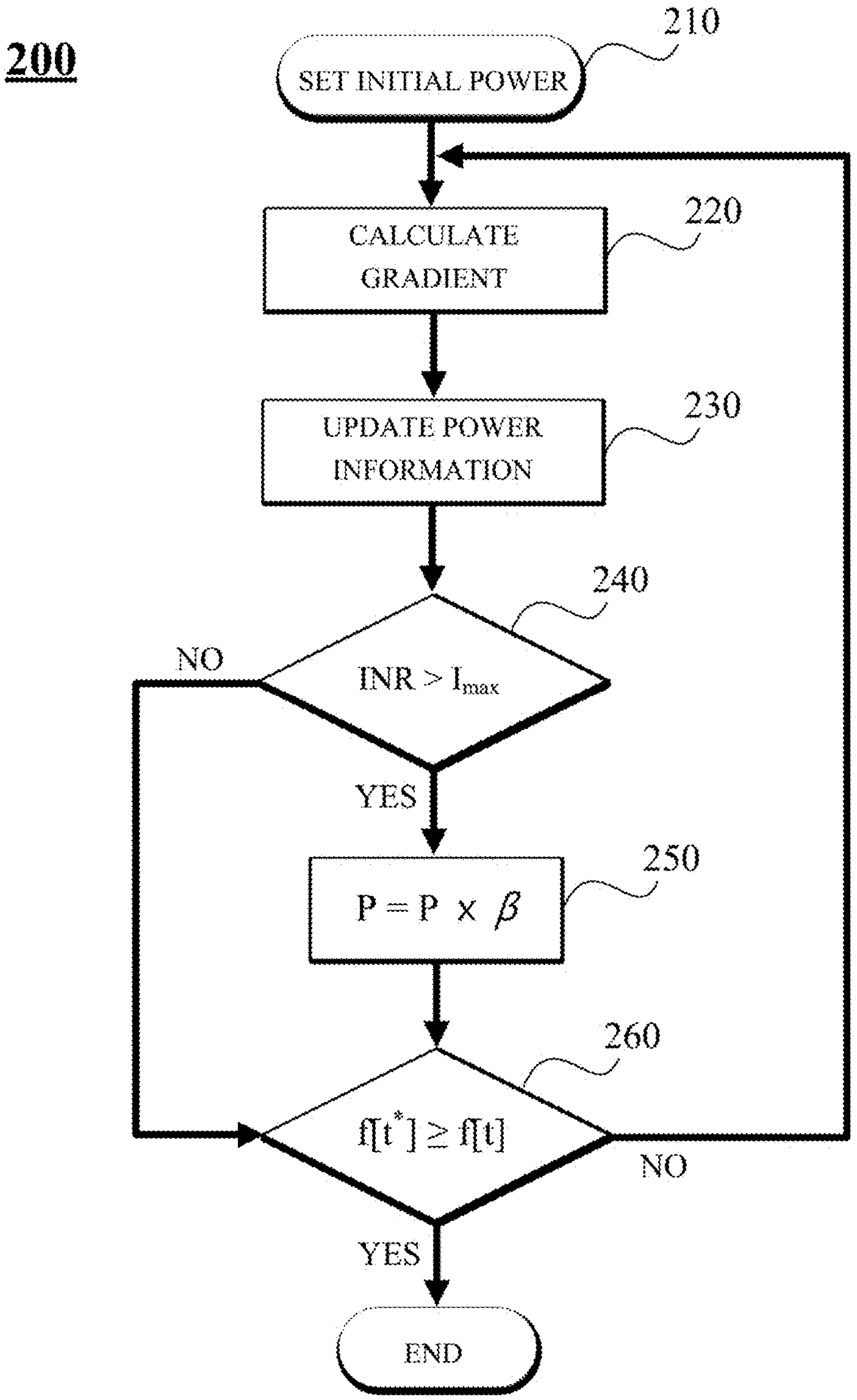
FIG. 4 is a flowchart illustrating an example of a process of controlling the power of the base stations in the spectrum sharing environment.

FIG. 4 is a flowchart illustrating an example of a process 200 of controlling the power of base stations in a spectrum sharing environment. As described above, the control device sets the sensitivity to the influence of interference and controls the power in a direction of maximizing the object function through the gradient descent algorithm.

Assume that the object function of Equation 1 or Equation 11 with predetermined interference sensitivity $\mu$ is set.

The control device sets predetermined initial power information for the base station in the time slot t (210).

The control device calculates a coverage radius of each base station on the basis of the initial power information. The coverage radius may be calculated by Equation 3 or Equation 4. As described above, Equation 4 represents a coverage radius projected onto the ground in consideration of a height of the base station.

The control device calculates the gradients of the coverage area $A_S$ and the interference area $A_P$ on the basis of the coverage radius of each base station (220). The gradient of the coverage area $A_S$ may be calculated by Equation 14 or 15. The gradient of the interference area $A_P$ may be calculated by Equation 16.

The control device updates power information for the next time slot t+1 through the gradient calculated as in Equation 10 (230). The base stations transmit radio signals with power according to the updated power information. In a service area, the terminal (incumbent user) calculates an interference amount (interference value), which is summed based on received signals.

The control device determines whether an interference-to-noise ratio (INR) of the interference amount transmitted by the terminal exceeds a threshold Ima (240).

When INR>$I_{max}$ (YES in 240), the control device adjusts the power information as in Equation 22 (250).

Meanwhile, when the updated power exceeds an allowable interference limit of the terminal, the control device controls the power of all base stations to be reduced as much as a predetermined ratio.

When INR≤$I_{max}$ (NO in 240), the control device calculates the object function f[t*] on the basis of power at a corresponding point in time. In addition, when the power information is adjusted in operation 250, the control device calculates the object function f[t*] on the basis of the power at the corresponding point in time.

When f[t*] is greater than or equal to an object function f[t] in a previous cycle (YES in 260), the control device stops the power control.

The control device may repeat the power control process described in FIG. 4 on the basis of the received interference value according to the position of the terminal.

The inventors evaluated the performance of the above-described power control algorithm.

The inventors set up an environment in which 15 base stations, each having an arbitrary height $h_n \in [10,50]$ m, are uniformly distributed in a 2×2 km area. An incumbent receiver Rx is positioned at coordinates (5 km, 5 km) at a height of 100 m. Parameters used in a test includes interference sensitivity p=1, communication parameter γ=2.5, $P_{th}$=10 dBm, $I_{max}$=−70 dBm, C=−40 dB, G=0 dB for base station-base station communication, G=−30 dB for Rx communication with a base station, base station maximum power $P_{max}$=$3^8$ Watt, and base station minimum power $P_{min}$=0.2 Watt.

Techniques for comparison are as follows: (i) Equi-power allocation in which the power of all base stations is equally increased until the interference received by the terminal reaches a threshold, (ii) Equi-interference allocation in which power is controlled to enable the terminal to receive the same interference from each base station on the basis of a predetermined distance, (iii) a Voronoi approach in which cell boundaries of base stations are set to correspond to Voronoi tessellation (see J. G. Andrews, F. Baccelli, and R. K. Ganti, "A tractable approach to coverage and rate in cellular networks," IEEE Trans. on commun., vol. 59, no. 11, pp. 3122-3134, 2011), (iv) a Krishnan technique in which power is incrementally sequentially controlled up to a maximum value from a base station positioned far away from a terminal (Krishnan), and (v) a genetic algorithm technique in which the power of a plurality of base stations is controlled using a genetic algorithm (see O. P. Adare et al., "Uplink power control in integrated access and backhaul networks," in Proc. IEEE Int. Symp. Dyn. Spect. Access Netw. (DySPAN), 2021, pp. 163-168). The following Table 1 shows the comparison results of the performance of the proposed technique and the techniques for comparison. In Table 1, "Coverage" denotes the area of the coverage area, "Interference" denotes the area of the interference area, and "Score" denotes a value quantifying the number of iterations of the control algorithm.

TABLE 1

| | Results | | |
|---|---|---|---|
| Methods | Coverage | Interference | Score |
| Proposed | 6.025 | 0.092 | 5.842 |
| Equi-pwr | 5.601 | 1.094 | 4.507 |
| Equi-intf | 5.843 | 1.396 | 4.447 |
| Voronoi | 4.964 | 0.000 | 4.964 |
| Krisnan | 5.920 | 1.772 | 4.148 |
| Genetic | 6.248 | 0.290 | 5.958 |

Referring to Table 1, it can be seen that the proposed technique described in FIG. 4 has a wide coverage area and a small interference area. The genetic algorithm had a slightly larger coverage area than the proposed technique, but had a disadvantage in that the interference area was relatively large. Overall, the proposed technique had the best performance index.

Figure 5:
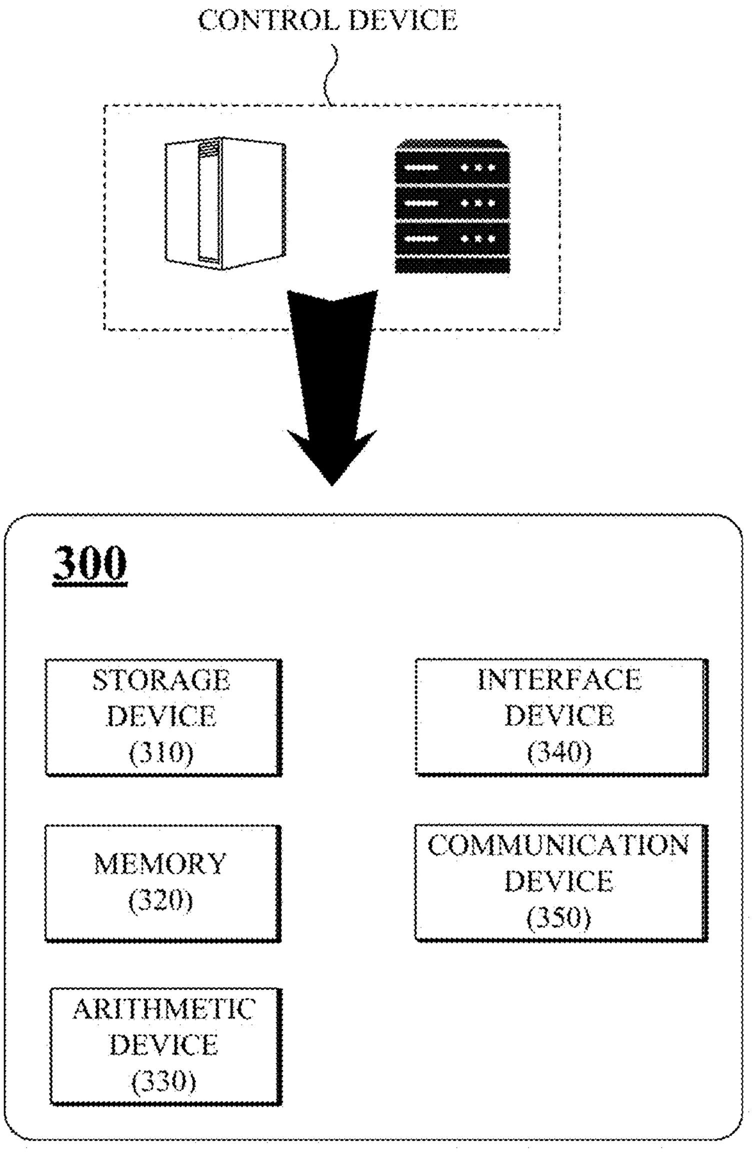
FIG. 5 is a diagram illustrating an example of a control device for controlling the power of the base stations in the spectrum sharing environment.

FIG. 5 is a diagram illustrating an example of a control device 300 for controlling the power of base stations in a spectrum sharing environment. The control device may be either a SAS or a core unit of a mobile communication network.

The control device 300 may include a storage device 310, a memory 320, a arithmetic device 330, an interface device 340, and a communication device 350.

The storage device 310 may store a program for controlling the power of a base station. The storage device 310 may store a function or program for calculating a coverage radius, a coverage area, and an interference area.

The storage device 310 may store parameters for power control. The parameters include interference sensitivity and a weight parameter for power control.

The memory 320 may store data and information generated by the control device 300 during a process of controlling the power of a base station.

The interface device 340 is a device which receives predetermined commands and data from an external device. The interface device 340 may receive parameters for a power control model from a physically connected input device or an external storage device.

The interface device 340 includes a component for transmitting data or information received by the communication device 350 to inside of the control device 300.

The communication device 350 may be a component that receives and transmits predetermined information through a wired or wireless network.

The communication device 350 may receive the parameters for power control.

The communication device 350 may transmit determined power information to base stations in a service area.

The communication device 350 may receive a summed interference amount (interference value) received at a current position from an incumbent terminal.

The arithmetic device 330 may calculate a coverage radius for each of the base stations in the service area on the basis of initial power information of the time slot t.

The arithmetic device 330 may calculate the gradients of a coverage area and an interference area for each of the base stations on the basis of the coverage radius. The gradient of the coverage area $A_S$ may be calculated by Equation 14 or Equation 15. The gradient of the interference area $A_P$ may be calculated by Equation 16.

The arithmetic device 330 may update power information of each of the base stations in the next time slot t+1 on the basis of the gradient.

When the summed interference amount of the incumbent terminal, which is received from the base stations, exceeds a predetermined threshold, the arithmetic device 330 may change power information in the time slot t+1 to have a lower value than power information in the time slot t as in Equation 22.

When a value of an object function set in the time slot t+1 is greater than or equal to a value of the object function in the time slot t+1, the arithmetic device 330 may stop the power control for the base stations in the time slot t+1.

The arithmetic device 330 may be a device such as a processor for processing data and performing predetermined calculations or a chip in which an application (AP) program is embedded.

In addition, as described above, the method of controlling the power of a base station in a spectrum sharing environment may be implemented as a program (or AP) including an executable algorithm that is executable on a computer. The program may be stored and provided in a transitory or non-transitory computer readable medium.

The non-transitory computer readable medium may be a medium that stores data semi-permanently and is readable by a device rather than a medium that stores data for a short period of time, such as a register, a cache, or a memory. Specifically, various applications or programs described above may be stored and provided in non-transitory readable media such as compact discs (CDs), digital versatile discs (DVDs), hard disks, Blu-ray discs, universal serial buses (USBs), memory cards, read-only memories (ROMs), programmable ROMs (PROMs), erasable PROMs (EPROMs), electrically EPROMs (EEPROMs), and flash memories.

The transitory readable media include various random access memories (RAMs) such as static RAMs (SRAMs), dynamic RAMs (DRAMs), synchronous DRAMs (SDRAMs), double data rate SDRAMs (DDR SDRAMs), enhanced SDRAMs (ESDRAMs), synclink DRAMs (SL-DRAMs), and direct rambus RAMs (DRRAMs).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of controlling power of a base station in a spectrum sharing environment, the method comprising:

setting, by a control device, predetermined initial power information for a plurality of base stations located in a service area in a time slot t;

calculating, by the control device, a coverage radius for each of the base stations on the basis of the initial power information;

calculating, by the control device, gradients of a coverage area and an interference area for each of the base stations on the basis of the coverage radius for each of the base stations; and updating, by the control device, power information for each of the base stations in a time slot t+1 on the basis of the gradients of each of the base stations, wherein the base stations provide communication for an incumbent terminal in the spectrum sharing environment, and wherein, when coverage areas of two or more base stations among the base stations overlap in the service area, the interference area is defined as an area obtained by removing a polygon area from an area where the coverage areas of the two or more base stations overlap; and the polygon area is defined by polygon vertices at points where center points of the two or more base stations and coverage boundaries of the two or more base stations meet.

2. The method of claim 1, wherein, when a summed interference amount of the incumbent terminal, which is received from the base stations, exceeds a predetermined threshold, the control device controls the power information in the time slot t+1 to have a lower value than the power information in the time slot t.

3. The method of claim 1, wherein, when a value of an object function set in the time slot t+1 is greater than or equal to a value of an object function in the time slot t, the control device stops the power control for the base stations in the time slot t+1.

4. The method of claim 3, wherein the object function is a function set to maximize the coverage area while minimizing the interference area between the base stations.

5. An apparatus of controlling power of a base station in a spectrum sharing environment, the apparatus comprising:

an arithmetic device configured to calculate gradients of a coverage area and an interference area for each of a plurality of the base stations on the basis of a coverage radius, for each of the base stations and update power information for each of the base stations in a time slot t+1 on the basis of the gradients of each of the base stations, wherein the coverage radius is calculated on the basis of predetermined initial power information for the plurality of base stations located in a service area in a time slot t, wherein the base stations provide communication for an incumbent terminal in the spectrum sharing environment, and wherein, when coverage areas of two or more base stations among the base stations overlap in the service area, the interference area is defined as an area obtained by removing a polygon area from an area where the coverage areas of the two or more base stations overlap; and the polygon area is defined by polygon vertices at points where center points of the two or more base stations and coverage boundaries of the two or more base stations meet.

6. The apparatus of claim 5, wherein:

the communication device receives a summed interference amount of an incumbent terminal, which is received from the base stations; and when the summed interference amount exceeds a predetermined threshold, the arithmetic device controls the power information in the time slot t+1 to have a lower value than the power information in the time slot t.

7. The apparatus of claim 5, wherein, when a value of an object function set in the time slot t+1 is greater than or equal to a value of an object function in the time slot t, the arithmetic device stops the power control for the base stations in the time slot t+1.

8. The apparatus of claim 7, wherein the object function is a function set to maximize the coverage area while minimizing the interference area between the base stations.

* * * * *